United States Patent
Münster

(10) Patent No.: US 7,124,863 B2
(45) Date of Patent: Oct. 24, 2006

(54) BRAKE MECHANISM FOR COUPLING TWO COMPONENTS

(75) Inventor: Martin Münster, Wilhelmsdorf (DE)

(73) Assignee: ZF Friedrichshafen AG, Friedrichshafen (DE)

(*) Notice: Subject to any disclaimer, the term of this patent is extended or adjusted under 35 U.S.C. 154(b) by 1 day.

(21) Appl. No.: 10/995,792

(22) Filed: Nov. 23, 2004

(65) Prior Publication Data

US 2005/0126866 A1    Jun. 16, 2005

(30) Foreign Application Priority Data

Dec. 11, 2003    (DE) .................... 103 57 853

(51) Int. Cl.
*B60L 7/00*    (2006.01)
*F16D 59/02*    (2006.01)

(52) U.S. Cl. .................................... 188/161

(58) Field of Classification Search .......... 188/71.1, 188/158, 161, 164, 166, 167, 171, 173, 156, 188/157, 184, 187; 280/124.107, 5.511, 280/5.51, 124.106, 124.11, 124.111; 192/84.3, 192/84.31; 267/188, 191
See application file for complete search history.

(56) References Cited

U.S. PATENT DOCUMENTS 6,484,857 B1    11/2002    Vonnegut et al.

FOREIGN PATENT DOCUMENTS

| DE | 2 409 150 | 8/1974 |
|---|---|---|
| DE | 693 02 712 T2 | 9/1996 |
| DE | 101 44 111 A1 | 3/2003 |
| DE | 102 37 439 A1 | 3/2003 |
| DE | 102 04 284 A1 | 8/2003 |
| DE | 102 25 296 A1 | 12/2003 |
| WO | WO-2004/0 37 573 A1 | 5/2004 |

*Primary Examiner*—Thomas Williams
(74) *Attorney, Agent, or Firm*—Davis & Bujold, P.L.L.C.

(57) ABSTRACT

A brake assembly (1) for the coupling of two components, especially two stabilizer-halves of a motor vehicle stabilizer, with a brake housing (2), a motor shaft (3) penetrating through the brake housing (2), a magnet component (6) and an electrically connectable armature (9), rigidly connected with the brake housing (2) and the motor shaft (3). To assure a reasonable degree of security, provision is made that the magnet component (6) and the connectable armature (9) are longitudinally displaceably bound to the brake housing (2) and the motor shaft (3) and that, on the motor shaft (3), a spindle nut (5) is threadedly placed and that, in the event of a longitudinal displacement of the spindle nut (5) into axial end domains, respectively, the magnet component (6) or the armature (9) are so moved that a separative distance (d) between them is greater than the distance (d) is during mid-positioning and that the brake assembly (1) in both end positions of the spindle nut (5) are always closed and in the mid-position are open with or without application of electrical power.

8 Claims, 3 Drawing Sheets

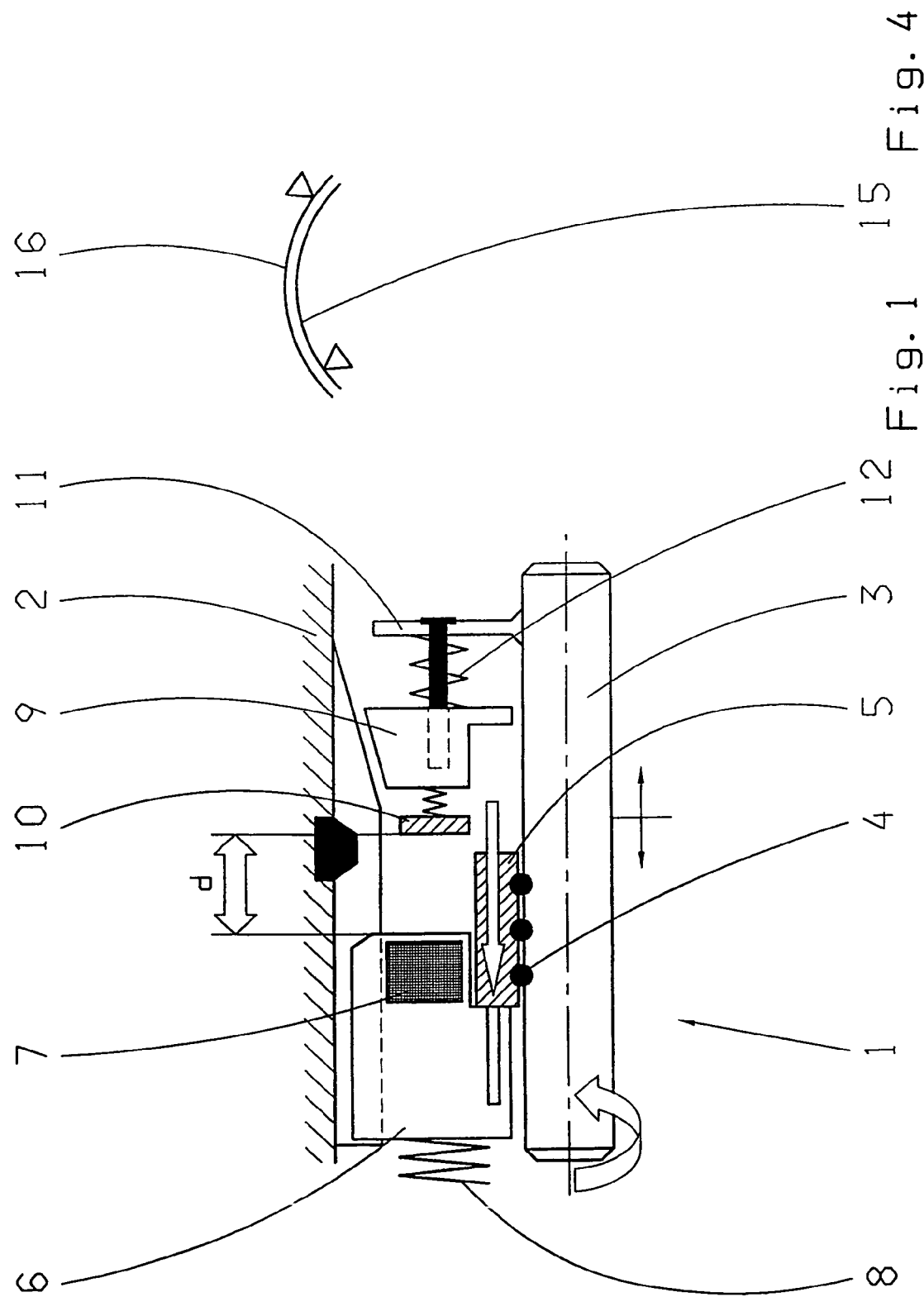

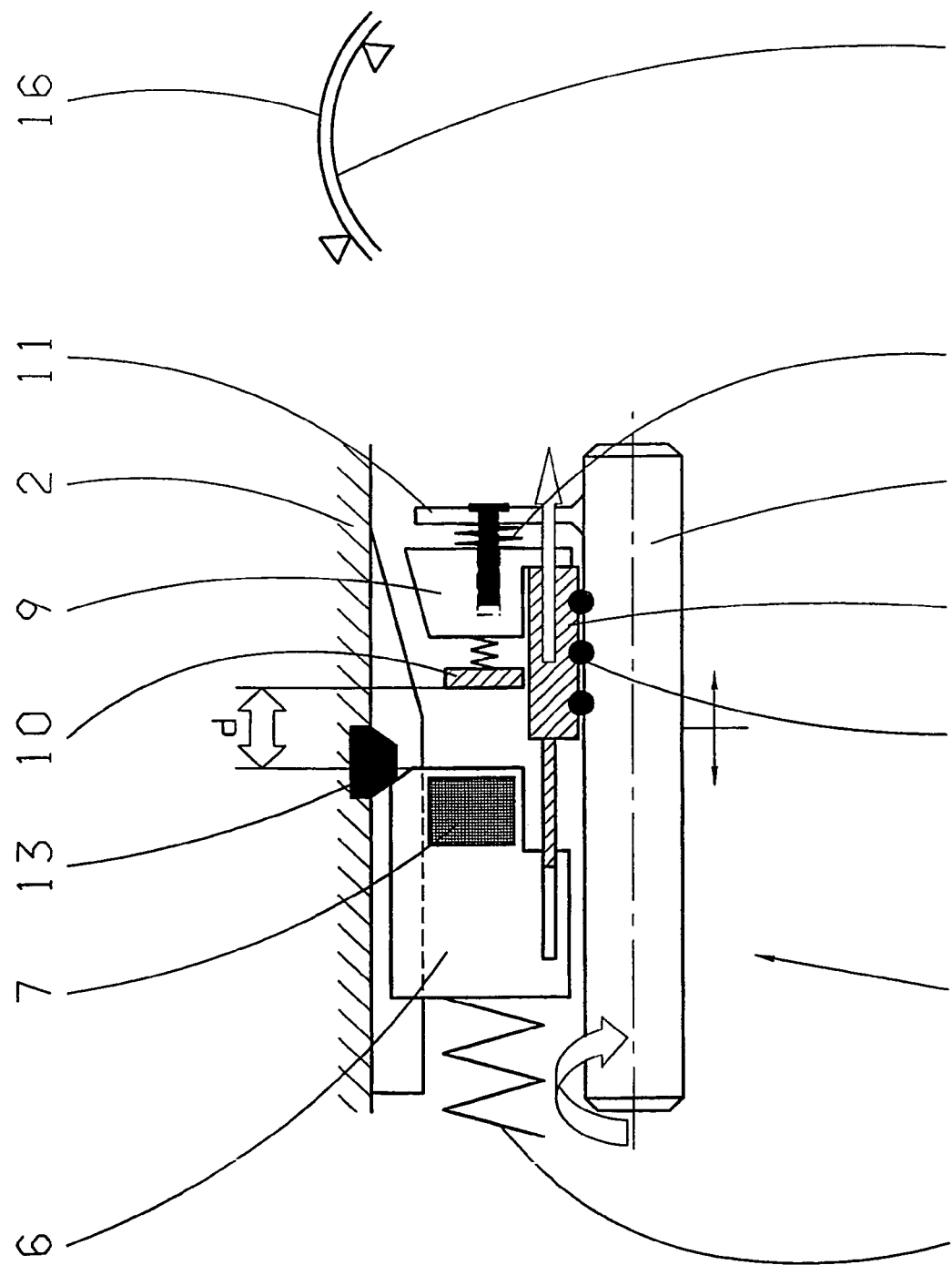

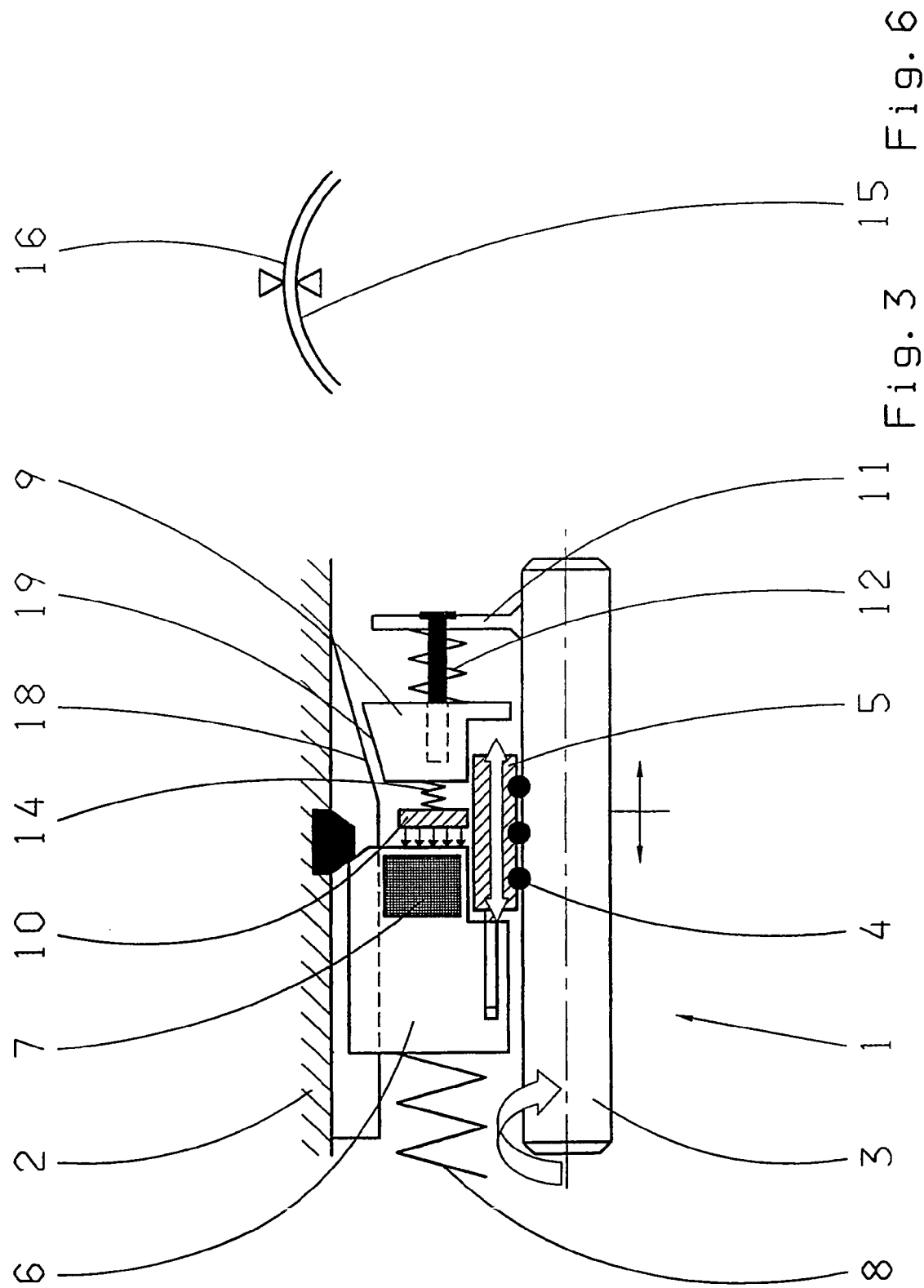

BRAKE MECHANISM FOR COUPLING TWO COMPONENTS

This application claims priority from German Application Serial No. 103 57 853.6 filed Dec. 11, 2003.

Field of the Invention

The invention concerns a brake assembly for coupling two components.

BACKGROUND OF THE INVENTION

Rotative drives have been installed to serve as servo or control means in many applications, especially in machine tools and motor vehicles. In the case of electrically activated rotative drives, as a rule, blocking or brake apparatuses are present for prevention of under or over runs. Besides some shape fit mechanisms, the blocking or braking apparatuses can often be found as electro-magnetic shifting frictional clutches and brakes.

In accordance with the character of a major interruption, one must make a distinction between power loss during operation wherein engagement of the brake can only be attained by residual voltage and, contrarily, a power loss while equipment is idle wherein disengagement of the brake can only be executed by possible backup voltage.

In a case of backup voltage braking, if this voltage should fail, then the brake engages itself. Some known designs have the capability of overcoming a field of a parallel placed permanent magnet, via an electrically energized coil, whereby the brake is held in its disengaged position. On the other hand, in a case of total voltage failure, only the magnetic field of a permanent magnet can exist whereby a brake will engage. This type of assembly is adapted to applications, which require an absolute engagement of a brake when voltage is lost so that, for example, a positioning or a control operation can be brought to a stop. For example, one application to the furnish acting stabilizers for roll control of motor vehicles wherein the stabilizer halves, when brakes are disengaged, are such that the halves positionally oppose one another. Contrarily, if brakes are disengaged then the stabilizer halves become firmly coupled together. In the case of an electric power failure, a rigid stabilizer is required so that the brake is immediately blocked.

If power failure should occur in the use of rotative bodies which turn toward each other, then their relative positioning is immediately fixed. In the case of the above mentioned application, where an activated stabilizer is involved, it is possible for a drive-dynamic maneuver in the interface area to be carried out at the instant of engagement. Consequently, in a case of defection, during a turn into a fast lane, a stabilizer with rotated halves is blocked. Upon a renewed change back to a travel lane, then the stabilizer is so stressed that its action is largely suspended or can only be put into action by a very large chassis rolling. Thereby, driving stability is lost up to the point of danger of upset.

DE 693 02 712 T2 teaches that a vehicle with stabilizers on the front and rear axles, the stabilizing halves can be pivoted toward one another by a servo motor. In this arrangement, no braking assembly is provided between the stabilizer halves.

With this background, the purpose of this invention is to achieve improvements with regard to the state of the technology and to create a backup current apparatus, which can assure increased safety even in the case of an external defect in dynamically critical situations. This relates especially to applications involving stabilizers on motor vehicles.

SUMMARY OF THE INVENTION

The basic concept of the invention is to bring the rotational positions of two rotative bodies together, namely the stabilizers, which bodies are joined by the brake assembly and to give this consideration in a brake engagement procedure. That is, a engaging of the brake assembly is only allowable within a prescribed angular range about a central position, i.e., within a mid-angular area. Since this alignment must be brought about at once when a power failure occurs, a purely mechanical response must be created in order to have assurance that such is done.

The equipment concerned includes the brake housing and the motor shaft of the invented brake assembly, which are coupled with a magnet component, that is to say, with an electrically connectable friction cone which, without electrical energy, will cause the brake to engage. The brake housing and the motor shaft can optionally be connected with one of the rotating bodies. More advantageously, a ratio reducing gear set would be provided between the motor shaft and a stabilizer half. The magnet component and the friction cone can optionally be attached to the brake housing or to the motor shaft. In case the brake housing is rotatable, then, in accordance with the invented brake assembly, then no brake, but rather a clutch will be supplied.

In accordance with the invention, a thread induced, axial displacement of the friction cone and the magnet component along the motor shaft is achieved, via the spindle nut installed thereon, into the extreme end limits. When this occurs, the brake assembly cannot engage. In this operation, the axial position of the spindle nut correlates directly with the relative angular location of the rotating body so that an exact positioning can be achieved.

BRIEF DESCRIPTION OF THE DRAWINGS

The invention will now be described, by way of example, with reference to the accompanying drawings in which:

FIG. 1 shows an axial section through an invented brake assembly for an activated stabilizer wherein the spindle nut is shown in a displacement to the left;

FIG. 2 shows a corresponding presentation wherein the spindle nut is shown displaced to the right;

FIG. 3 shows a corresponding presentation wherein the spindle nut is shown placed in the mid-section;

FIG. 4 shows the position of two motor vehicle stabilizer-halves when the spindle nut is located in accordance with FIG. 1;

FIG. 5 shows the position of two motor vehicle stabilizer-halves when the spindle nut is located in accordance with FIG. 2; and FIG. 6 shows the position of two motor vehicle stabilizer-halves when the spindle nut is located in accordance with FIG. 3.

DETAILED DESCRIPTION OF THE INVENTION

FIG. 1 to FIG. 3 respectively, show the brake assembly located between the stabilizer halves without a drive and a gear reducing ratio set.

As can be seen, a brake assembly 1 possesses a brake housing 2, an axially extending motor shaft 3, which said shaft has been designed as a threaded spindle, a spindle nut 5, set over bearings 4 on said motor shaft 3, and an electromagnetic component 6 which carries a permanent magnet 7, whereby the electromagnetic component 6 is barred from rotation by the brake housing 2, but can be longitudinally displaced in the axial direction, and is held in a middle position by a spring 8. Further the brake assembly 1 possesses an electrically connectable friction cone 9, with a disc 10, whereby the friction cone 9 on a projection 11 radially extends itself from the motor shaft 3 and is denied rotation, but again can be displaced axially, as well as being held in the midsection by means of a spring 12.

The brake assembly 1 is a part of an activated stabilizer of a motor vehicle, as demonstrated in FIG. 4, by two schematically drawn stabilizer halves 15 and 16, the middle positions of which are indicated by arrows. The motor shaft 3 is driven by an electric motor (not shown) and is in connection with the stabilizer half 15 by means of a ratio-reducing gear train (likewise not shown). The brake housing 2 is directly affixed to the other stabilizer half 16.

Fundamentally, the arrangement of the brake housing 2 and the motor shaft 3 to the ratio-reducing gear train and to the stabilizer halves is optional. In one of the two directions, a corresponding relative rotation of the stabilizer halves 15, 16 toward one another is achieved with a corresponding reduction in ratio, via a rotation of the motor shaft 3.

FIG. 1 shows one position in a case of multiple turning of the motor shaft 3, wherein the spindle nut is moved to the left. In FIG. 4, the relative turning of the stabilizers 15, 16 is somewhat less, due to said reduction in ratio. The spindle nut 5 now impacts against the electromagnetic component 6 and pushes this against the action of the spring 8 to the left, so that a separating distance d to the disc 10 is increased. Since the magnetic force declines in proportion to the square of the distance d, and further, in that the axial displacement of the disc is limited by design to the maximum thrust of an armature spring 14, the result is, in the case of the depicted displacement that even without application of current to the magnet component 6, the brake apparatus 1 is not engaged so that the stabilizer halves 15, 16 cannot be rigidly coupled.

Now as to the positioning in FIG. 2, the stabilizer halves 15, 16, in accordance with FIG. 5, are rotated in a direction counter to that of FIG. 4, and are thus turned relatively towards each other. The spindle nut 5 is displaced from the middle point, because of a contrary rotation of the motor shaft 3 and proceeds to the right, also pushing the friction cone 9 and the disc 10 to the right, against the force of the spring 12.

Even at this displacement to the right, the distance d separating the disc 10 and the electromagnetic component 6 is too great to allow a closure of the brake assembly 1 on the basis of magnetic force between the disc 10 and the electromagnetic component 6, —with or without application of electrical power. In this situation, it would be advantageous to have the design provide a blocking means 13 on the right side to arrest the electromagnetic component 6 of the brake. This could also be accomplished by a limited extension of the spring 8 or, again, by means of a ring installed in the housing In the case of the middle positioning as shown in FIG. 3—wherein the stabilizers halves 15, 16 do not coincide in the manner shown in FIG. 6 or are separate from one another within the middle area by an angle—then the spindle nut 5 must be axially extending itself very little or not at all on the motor shaft 3. Both the fixed electromagnetic component 6 as well as the probably still rotating friction cone 9, together with the disc 10, find themselves in the designed position for a closure of the brake apparatus 1. The illustrated position of FIG. 3 is attained upon the application of current to the friction cone 9 without brake engagement, that is, with an disengaged brake assembly 1.

Without the application of electrical current to the magnet component 6, the brake assembly 1 can shut itself, since the separating distance d at a positioning of the stabilizer halves 15, 16 in a central-angular area of the mid-position, is smaller or equal to the maximum possible thrust of the armature spring 14.

If the illustrated rotational positions of FIGS. 3 and 6 present only a zero clearance between the left and right rotation of the two stabilizer halves 15, 16, then the motor shaft 3 rotates at a very high rate of rotational speed. In order to be certain that the brake assembly 1 reliably engages, an additional frictional inner cone 18 on the brake housing 2 and a corresponding frictional outer cone 19 on the friction cone 9 is provided, which engagingly extend to the electromagnetic component 6 and to the disc 10. In this way, avoidance is assured that a possible residual rotation of the motor shaft 3 will lead to a displacement of one of the two brake parts 2, 3.

The allowable deviation from the zero position, that is, the residual rotation of the two stabilizers 15, 16 is determined by the play provided between the spindle nut 5 and the two brake components. In accordance with the application of the invention, a very precise determination or a very secure determination can be made. Since this brake assembly consists only of mechanical components, it is thus independent of computer software and the functioning of such. Thus, even in the case of power failure, the invented brake assembly is highly reliable.

REFERENCE NUMERALS 1 brake assembly
2 brake housing
3 motor shaft
4 bearing
5 nut, for threaded spindle
6 electromagnetic component
7 permanent magnet
8 spring
9 friction cone
10 disc
11 projection
12 spring
13 detent, blocking means
14 armature spring
15 half of stabilizer
16 half of stabilizer
18 frictional inner cone
19 frictional outer cone
d separating distance

The invention claimed is:

1. A brake assembly for releasably coupling two components to one another, the brake assembly comprising:
   at least one brake housing (2);
   a motor shaft (3) extending axially through the brake housing (2);
   an electromagnetic component (6) supported by the brake housing (2) and being longitudinally slidable with respect to the brake housing (2);
   a frictional cone (9) supported by the motor shaft (3) and being axially displaceable therealong;
   a spindle nut (5) threadedly mounted on the motor shaft (3) and is axially displaced along the motor shaft (3), the spindle nut (5) having a central position and being axially displaceable to a first end position in which at least the electromagnetic component (6) is also displaced with the spindle nut (5), and the spindle nut (5) being axially displaceable to a second end position in which at least the frictional cone (9) is also displaced with the spindle nut (5);

a separating distance (d) between the electromagnetic component (6) and the frictional cone (9), when the spindle nut (5) is in one of the first and the second end positions, is greater than the separating distance (d) between the electromagnetic component (6) and the frictional cone (9) when the spindle nut (5) is in the central position;

the brake assembly (1) is disengaged, regardless of whether or not electrical current is applied to the electromagnetic component (6), when the spindle nut (5) is in one of the first and the second end positions; and the brake assembly (1) is engaged, whether or not electrical current is applied to the electromagnetic component (6), when the spindle nut (5) is in its central position, and the brake assembly (1) is disengaged when electrical current is applied to the electromagnetic component (6).

2. The brake assembly according to claim 1, wherein the electromagnetic component (6) is supported by the brake housing (2) so as to prevent rotation thereof, and the armature (9) is supported so as to rotate with the motor shaft (3).

3. The brake assembly according to claim 1 wherein, when the spindle nut (5) is displaced toward the first end position, the electromagnetic component (6) is moved away from a mid-position, and when the spindle nut (5) is displaced toward the second end position, the frictional cone (9) is moved away from a mid-position.

4. The brake assembly according to claim 3, wherein a component spring (8) facilitates biasing the electromagnetic component (6) toward its mid-position, and a cone spring (12) facilitates biasing the frictional cone (9) toward its mid-position.

5. The brake assembly according to claim 1, wherein a component spring (8) facilitates biasing the electromagnetic component (6) toward its mid-position, and a cone spring (12) facilitates biasing the frictional cone (9) toward its mid-position.

6. The brake assembly according to claim 1, wherein the brake housing (2) fixedly supports an inner cone (18) and the frictional cone (9) has an outer cone (19), and the brake assembly (1) is engaged by frictional engagement between the inner cone (18) and the outer cone (19).

7. The brake assembly according to claim 3, wherein the electromagnetic component (6) has a permanent magnet for attracting the frictional cone (9) so that, when no electrical current is applied and the electromagnetic component (6) and both the electromagnetic component (6) and the frictional cone (9) are in their mid-positions, the permanent magnet attracts the frictional cone (9) toward the electromagnetic component (6) and engages the brake assembly (1).

8. A brake assembly for releasably coupling a first stabilizer half to a second stabilizer half, the brake assembly comprising:

the first stabilizer half having a brake housing (2);

the second stabilizer half being connected to a motor shaft (3) via a gear drive, and the motor shaft (3) extending axially through the brake housing (2);

an electromagnetic component (6) supported by the brake housing (2) and being longitudinally slidable with respect to the brake housing (2);

a frictional cone (9) supported by the motor shaft (3) and being axially displaceable therealong;

a spindle nut (5) threadedly mounted on the motor shaft (3) and is axially displaced along the motor shaft (3), the spindle nut (5) having a central position and being axially displaceable to a first end position in which at least the electromagnetic component (6) is also displaced with the spindle nut (5), and the spindle nut (5) being axially displaceable to a second end position in which at least the frictional cone (9) is also displaced with the spindle nut (5);

a separating distance (d) between the electromagnetic component (6) and the frictional cone (9), when the spindle nut (5) is in one of the first and the second end positions, is greater than the separating distance (d) between the electromagnetic component (6) and the frictional cone (9) when the spindle nut (5) is in the central position;

the brake assembly (1) is disengaged, regardless of whether or not electrical current is applied to the electromagnetic component (6), when the spindle nut (5) is in one of the first and the second end positions; and the brake assembly (1) is engaged, whether or not electrical current is applied to the electromagnetic component (6), when the spindle nut (5) is in its central position, and the brake assembly (1) is disengaged when electrical current is applied to the electromagnetic component (6).

* * * * *